(12) United States Patent
Jang

(10) Patent No.: US 8,982,207 B2
(45) Date of Patent: Mar. 17, 2015

(54) AUTOMATED VISUAL INSPECTION SYSTEM

(75) Inventor: Jung Soon Jang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 349 days.

(21) Appl. No.: 12/897,158

(22) Filed: Oct. 4, 2010

(65) Prior Publication Data

US 2012/0081540 A1    Apr. 5, 2012

(51) Int. Cl.
| | |
|---|---|
| *H04N 7/18* | (2006.01) |
| *G01M 17/00* | (2006.01) |
| *G06F 7/00* | (2006.01) |
| *G06F 11/30* | (2006.01) |
| *G06F 19/00* | (2011.01) |
| *G07C 5/00* | (2006.01) |
| *B64F 5/00* | (2006.01) |

(52) U.S. Cl.
CPC .............. *B64F 5/0045* (2013.01); *Y10S 901/44* (2013.01)
USPC .......... 348/128; 348/125; 348/129; 701/29.1; 701/29.2; 701/29.3; 901/44

(58) Field of Classification Search
None
See application file for complete search history.

(56) References Cited

U.S. PATENT DOCUMENTS

| | | |
|---|---|---|
| 2,849,701 A | 8/1958 | Clark |
| 4,463,428 A | 7/1984 | Gilliam |
| 4,827,416 A | 5/1989 | Kawagoe et al. |
| 4,918,321 A * | 4/1990 | Klenk et al. .............. 250/559.05 |
| 5,014,042 A | 5/1991 | Michoud et al. |
| 5,036,935 A | 8/1991 | Kohara |
| 5,203,646 A | 4/1993 | Landsberger et al. |
| 5,220,263 A | 6/1993 | Onishi et al. |
| 5,237,404 A | 8/1993 | Tanaka et al. |
| 5,318,254 A | 6/1994 | Shaw et al. |
| 5,324,948 A | 6/1994 | Dudar et al. |
| 5,334,982 A | 8/1994 | Owen |

(Continued)

FOREIGN PATENT DOCUMENTS

| | | |
|---|---|---|
| EP | 0512866 | 11/1992 |
| EP | 1193168 | 4/2002 |

(Continued)

OTHER PUBLICATIONS

Office Action, dated Aug. 31, 2012, regarding U.S. Appl. No. 12/701,033, 28 pages.

(Continued)

*Primary Examiner* — Joseph Ustaris
*Assistant Examiner* — Ellyar Y Barazesh
(74) *Attorney, Agent, or Firm* — Yee & Associates, P.C.

(57) ABSTRACT

A method and apparatus for inspecting an object. In response to a presence of the object in an inspection area, a volume containing the object is identified. The volume has a plurality of portions. A number of sensor systems is assigned to the plurality of portions of the volume. Each sensor system in the number of sensors systems is assigned to a number of portions in the plurality of portions of the volume based on whether each sensor system is able to generate data with a desired level of quality about a surface of the object in a particular portion in the plurality of portions. Data about the surface of the object is generated using the number of sensor systems assigned to the plurality of portions of the volume. A determination is made as to whether a number of inconsistencies is present on the surface of the object using data.

18 Claims, 12 Drawing Sheets

(56) References Cited

U.S. PATENT DOCUMENTS

| | | | |
|---|---|---|---|
| 5,340,056 A | 8/1994 | Guelman et al. | |
| 5,351,621 A | 10/1994 | Tanaka et al. | |
| 5,416,476 A | 5/1995 | Rendon | |
| 5,487,440 A | 1/1996 | Seemann | |
| 5,490,646 A | 2/1996 | Shaw et al. | |
| 5,586,028 A | 12/1996 | Sekine et al. | |
| 5,633,707 A * | 5/1997 | Seemann | 356/35.5 |
| 5,695,155 A | 12/1997 | Macdonald et al. | |
| 5,726,705 A * | 3/1998 | Imanishi et al. | 348/92 |
| 5,831,570 A | 11/1998 | Ammar et al. | |
| 5,832,187 A | 11/1998 | Pedersen et al. | |
| 5,845,002 A * | 12/1998 | Heck et al. | 382/110 |
| 5,845,725 A | 12/1998 | Kawada | |
| 5,982,278 A | 11/1999 | Cuvelier | |
| 5,995,884 A | 11/1999 | Allen et al. | |
| 6,236,735 B1 * | 5/2001 | Bjorner et al. | 382/101 |
| 6,266,138 B1 * | 7/2001 | Keshavmurthy | 356/237.2 |
| 6,293,141 B1 | 9/2001 | Nance | |
| 6,364,026 B1 | 4/2002 | Doshay | |
| 6,476,712 B1 | 11/2002 | Achterholt | |
| 6,565,361 B2 | 5/2003 | Jones et al. | |
| 6,606,563 B2 | 8/2003 | Corcoran, III | |
| 6,671,588 B2 | 12/2003 | Otake et al. | |
| 6,819,265 B2 | 11/2004 | Jamieson et al. | |
| 6,825,758 B1 | 11/2004 | Laitsaari | |
| 6,888,446 B2 | 5/2005 | Nantz et al. | |
| 6,898,484 B2 | 5/2005 | Lemelson et al. | |
| 6,904,335 B2 | 6/2005 | Solomon | |
| 6,907,799 B2 | 6/2005 | Jacobsen et al. | |
| 6,947,797 B2 | 9/2005 | Dean et al. | |
| 6,953,094 B2 | 10/2005 | Ross et al. | |
| 6,970,576 B1 * | 11/2005 | Tilsley | 382/103 |
| 6,984,952 B2 | 1/2006 | Peless et al. | |
| 7,076,335 B2 | 7/2006 | Seemann | |
| 7,212,106 B2 | 5/2007 | Katou | |
| 7,218,993 B2 | 5/2007 | Yasukawa et al. | |
| 7,236,861 B2 | 6/2007 | Paradis et al. | |
| 7,250,849 B2 | 7/2007 | Spriggs et al. | |
| 7,280,890 B2 | 10/2007 | Seemann | |
| 7,303,010 B2 | 12/2007 | de Guzman et al. | |
| 7,327,112 B1 | 2/2008 | Hlynka et al. | |
| 7,337,156 B2 | 2/2008 | Wippich | |
| 7,414,523 B2 | 8/2008 | Li et al. | |
| 7,417,738 B2 | 8/2008 | Taylor et al. | |
| 7,499,772 B2 | 3/2009 | Wilcox et al. | |
| 7,501,616 B2 | 3/2009 | Wiklof | |
| 7,586,422 B2 | 9/2009 | Goodman et al. | |
| 7,626,513 B2 | 12/2009 | Goodman et al. | |
| 7,627,447 B2 | 12/2009 | Marsh et al. | |
| 7,714,702 B2 | 5/2010 | Khuzadi | |
| 7,765,038 B2 | 7/2010 | Appleby et al. | |
| 7,765,668 B2 | 8/2010 | Townsend et al. | |
| 7,796,018 B2 | 9/2010 | Khuzadi | |
| 7,797,095 B2 | 9/2010 | Rado | |
| 7,813,888 B2 | 10/2010 | Vian et al. | |
| 7,817,026 B2 | 10/2010 | Watabe et al. | |
| 7,832,281 B2 | 11/2010 | Mian et al. | |
| 7,844,364 B2 | 11/2010 | McLurkin et al. | |
| 7,860,618 B2 | 12/2010 | Brandstetter et al. | |
| 7,894,948 B2 | 2/2011 | Stroud | |
| 7,896,113 B1 | 3/2011 | Ramirez | |
| 7,941,261 B2 | 5/2011 | Johnsen | |
| 8,051,547 B2 | 11/2011 | Toh et al. | |
| 8,060,270 B2 | 11/2011 | Vian et al. | |
| 8,078,319 B2 | 12/2011 | Franke et al. | |
| 8,140,250 B2 | 3/2012 | Mian et al. | |
| 8,145,367 B2 * | 3/2012 | Khatwa et al. | 701/16 |
| 8,150,105 B2 | 4/2012 | Mian et al. | |
| 8,181,532 B2 | 5/2012 | Schmidt et al. | |
| 8,260,485 B1 | 9/2012 | Meuth et al. | |
| 8,504,505 B2 | 8/2013 | Mintah | |
| 8,874,305 B2 | 10/2014 | Dolgov et al. | |
| 2002/0073788 A1 | 6/2002 | Hatley et al. | |
| 2002/0183866 A1 * | 12/2002 | Dean et al. | 700/26 |
| 2003/0048081 A1 | 3/2003 | Seemann | |
| 2003/0089183 A1 | 5/2003 | Jacobsen et al. | |
| 2003/0135327 A1 | 7/2003 | Levine et al. | |
| 2003/0169335 A1 | 9/2003 | Monroe | |
| 2004/0030571 A1 | 2/2004 | Solomon | |
| 2004/0054507 A1 | 3/2004 | Mott | |
| 2004/0055746 A1 | 3/2004 | Ross et al. | |
| 2004/0073324 A1 | 4/2004 | Pierro et al. | |
| 2004/0073411 A1 | 4/2004 | Alston et al. | |
| 2004/0158358 A1 | 8/2004 | Anezaki et al. | |
| 2005/0033517 A1 | 2/2005 | Kondoh et al. | |
| 2005/0073585 A1 * | 4/2005 | Ettinger et al. | 348/155 |
| 2005/0113943 A1 | 5/2005 | Nian | |
| 2005/0113975 A1 | 5/2005 | Seemann | |
| 2005/0126794 A1 | 6/2005 | Palmer et al. | |
| 2005/0217589 A1 | 10/2005 | Daniel et al. | |
| 2005/0251291 A1 | 11/2005 | Solomon | |
| 2006/0085106 A1 | 4/2006 | Gaudiano et al. | |
| 2006/0114531 A1 * | 6/2006 | Webb et al. | 359/15 |
| 2006/0198952 A1 | 9/2006 | Nagase et al. | |
| 2006/0243857 A1 | 11/2006 | Rado | |
| 2006/0271251 A1 | 11/2006 | Hopkins | |
| 2007/0062299 A1 | 3/2007 | Mian et al. | |
| 2007/0081154 A1 * | 4/2007 | Mapoles et al. | 356/237.5 |
| 2007/0113690 A1 | 5/2007 | Wilcox et al. | |
| 2007/0129847 A1 | 6/2007 | Ulmer et al. | |
| 2007/0146728 A1 | 6/2007 | Pristner | |
| 2007/0208442 A1 | 9/2007 | Perrone | |
| 2007/0272841 A1 | 11/2007 | Wiklof | |
| 2008/0004749 A1 | 1/2008 | Hostettler | |
| 2008/0021604 A1 | 1/2008 | Bouvier et al. | |
| 2008/0140318 A1 | 6/2008 | Breed | |
| 2008/0148876 A1 | 6/2008 | Hock et al. | |
| 2008/0177411 A1 | 7/2008 | Marsh et al. | |
| 2008/0252489 A1 | 10/2008 | Naimer et al. | |
| 2008/0270866 A1 | 10/2008 | Choi et al. | |
| 2008/0297333 A1 | 12/2008 | Khuzadi | |
| 2008/0297375 A1 | 12/2008 | Khuzadi | |
| 2009/0055043 A1 * | 2/2009 | Mian et al. | 701/29 |
| 2009/0079839 A1 | 3/2009 | Fischer et al. | |
| 2009/0219393 A1 | 9/2009 | Vian et al. | |
| 2009/0243828 A1 | 10/2009 | Hering et al. | |
| 2009/0285491 A1 | 11/2009 | Ravenscroft et al. | |
| 2010/0017052 A1 | 1/2010 | Luce | |
| 2010/0023201 A1 | 1/2010 | Kinney et al. | |
| 2010/0039294 A1 | 2/2010 | Feyereisen et al. | |
| 2010/0063650 A1 | 3/2010 | Vian et al. | |
| 2010/0094487 A1 | 4/2010 | Brinkman | |
| 2010/0211358 A1 | 8/2010 | Kesler et al. | |
| 2010/0235037 A1 | 9/2010 | Vian et al. | |
| 2010/0250022 A1 | 9/2010 | Hines et al. | |
| 2010/0271191 A1 | 10/2010 | de Graff et al. | |
| 2010/0312387 A1 | 12/2010 | Jang et al. | |
| 2010/0312388 A1 | 12/2010 | Jang et al. | |
| 2011/0313614 A1 | 12/2011 | Hinnant, Jr. et al. | |
| 2012/0038492 A1 | 2/2012 | Maggiore et al. | |
| 2012/0041639 A1 | 2/2012 | Followell et al. | |
| 2012/0130701 A1 | 5/2012 | Khella | |
| 2012/0261144 A1 | 10/2012 | Vian et al. | |
| 2013/0261876 A1 * | 10/2013 | Froom et al. | 701/29.3 |
| 2014/0222325 A1 | 8/2014 | Followell et al. | |

FOREIGN PATENT DOCUMENTS

| | | | |
|---|---|---|---|
| EP | 1619625 | 1/2006 | |
| EP | 1619625 A2 * | 1/2006 | G06T 7/00 |
| EP | 1884453 | 2/2008 | |
| EP | 2208971 | 7/2010 | |
| EP | 2259245 | 12/2010 | |
| FR | 2930669 | 10/2009 | |
| GB | 2308656 | 7/1997 | |
| GB | 2429819 | 3/2007 | |
| JP | 2007183172 | 7/2007 | |
| WO | WO2004081488 | 9/2004 | |
| WO | WO2005113261 | 12/2005 | |
| WO | WO2006053433 | 5/2006 | |
| WO | WO2007080584 | 7/2007 | |
| WO | WO2008127468 | 10/2008 | |
| WO | WO2009142933 | 11/2009 | |
| WO | WO2010141180 | 12/2010 | |

(56) References Cited

FOREIGN PATENT DOCUMENTS

| WO | WO2011119634 | 9/2011 |
|---|---|---|
| WO | WO2012021177 | 2/2012 |
| WO | WO2012021179 | 2/2012 |
| WO | WO2012047479 | 4/2012 |

OTHER PUBLICATIONS

Final Office Action, dated Oct. 3, 2012, regarding U.S. Appl. No. 12/404,493, 18 pages.
Office Action, dated Aug. 31, 2012, regarding U.S. Appl. No. 12/854,646, 19 pages.
"In-Sight Line Scan Vision System", Cognex, Webinar, Feb. 2010, 17 pages.
Ollero, "Mutliple Heterogenous Unmanned Aerial Vehicles", Springer Tracts in Advanced Robotics, vol. 37, Copyright 2007, 233 pages (Abstract).
"Unmanned Aerial Vehicle (UAV) ZALA 421-04M chosen for Aerial Monitoring of Forest Fires", news.wood.ru, Feb. 2010, 3 pages.
Frost, "A Practical Guide to Using the In-Sight 5604 Line Scan Vision System", Cognex, In-Sight Vision Systems, Mar. 2009, 20 pages.
Gunatilake et al., "Image Understanding Algorithms for Remote Visual Inspection of Aircraft Surfaces", Proceedings of the SPIE conference on Machine Vision Applications in Industrial Inspection V, Apr. 1997, 12 pages.
DeVault, "Robotic system for underwater inspection of bridge piers", IEEE Instrumentation & Measurement Magazine, vol. 3, Iss.3, Sep. 2000, pp. 32-37 (Abstract).
GB Search Report and Examination Report dated Jun. 10, 2010 regarding application GB1003830.5, applicant's reference P49034GB/AER, applicant The Boeing Company, 8 pages.
GB Search Report and Examination Report dated Jun. 14, 2011 regarding application GB1100763.0, applicant's reference P51280GB/AER/LJW, applicant The Boeing Company, 9 pages.
PCT Search Report dated Dec. 2, 2010 regarding international application PCT/US2010/033917, applicant's reference 09-0117APCT, applicant The Boeing Company, 3 pages.
PCT Search Report and Written Opinion dated Jun. 16, 2011 regarding international application PCT/US2011/029466, applicant's reference 09-1070PCT, applicant The Boeing Company, 9 pages.
PCT Search Report and Written Opinion dated Jun. 8, 2011 regarding international application PCT/US2011/029766, applicant's reference 10-0173PCT, applicant The Boeing Company, 9 pages.
PCT Search Report dated Feb. 16, 2012 regarding international application PCT/US2011/030150, applicant's reference 10-0174PCT, applicant The Boeing Company, 6 pages.
PCT Search Report dated Feb. 7, 2012 regarding international application PCT/US2011/051830, applicant's reference 10-0602PCT, applicant The Boeing Company, 4 pages.
USPTO Office Action dated Oct. 4, 2011 regarding U.S. Appl. No. 12/701,033, 24 pages.
USPTO Final Office Action dated Apr. 13, 2012 regarding U.S. Appl. No. 12/701,033, 18 pages.
USPTO Office Action dated Apr. 13, 2012 regarding U.S. Appl. No. 12/404,493, 22 pages.
USPTO Office Action dated Jun. 15, 2012 regarding U.S. Appl. No. 13/086,521, 18 pages.
USPTO Office Action dated Nov. 8, 2010 regarding U.S. Appl. No. 12/124,565, 13 pages.
USPTO Final Office Action dated Mar. 15, 2011 regarding U.S. Appl. No. 12/124,565, 14 pages.
USPTO Notice of Allowance dated Aug. 18, 2011 regarding U.S. Appl. No. 12/124,565, 7 pages.
USPTO Office Action dated Feb. 24, 2012 regarding U.S. Appl. No. 12/560,569, 27 pages.
USPTO Final Office Action dated Jul. 24, 2012 regarding U.S. Appl. No. 12/560,569, 23 pages.
USPTO Office Action dated May 10, 2011 regarding U.S. Appl. No. 12/372,616, 27 pages.
USPTO Final Office Action dated Oct. 28, 2011 regarding U.S. Appl. No. 12/372,616, 30 pages.
USPTO Office Action dated Feb. 15, 2012 regarding U.S. Appl. No. 12/372,616, 22 pages.
USPTO Final Office Action dated Jul. 12, 2012 regarding U.S. Appl. No. 12/372,616, 23 pages.
USPTO Office Action dated Feb. 21, 2012 regarding U.S. Appl. No. 12/479,667, 25 pages.
Maggiore et al., "Runway Condition Monitoring", U.S. Appl. No. 12/730,594, filed Mar. 14, 2010, 43 pages.
Vian et al., "Fire Management System", U.S. Appl. No. 13/086,521, filed Apr. 14, 2011, 56 pages.
USPTO non-final office action dated Aug. 16, 2012 regarding U.S. Appl. No. 12/730,594, 25 Pages.
U.S. Appl. No. 12/404,493, filed Mar. 16, 2009, Vian et al.
U.S. Appl. No. 12/701,033, filed Feb. 5, 2010, Kesler et al.
U.S. Appl. No. 12/479,667, filed Jun. 5, 2009, Jang et al.
U.S. Appl. No. 12/560,569, filed Sep. 16, 2009, Jang et al.
Office Action, dated Dec. 21, 2012, regarding U.S. Appl. No. 12/372,616, 39 pages.
Final Office Action, dated Jan. 8, 2013, regarding U.S. Appl. No. 12/701,033, 27 pages.
Final Office Action, dated Dec. 20, 2012, regarding U.S. Appl. No. 12/730,594, 35 pages.
Office Action, dated May 23, 2013, regarding USPTO Application No. 12/70,594, 28 pages.
Final Office Action, dated Mar. 7, 2013, regarding U.S. Appl. No. 12/854,646, 22 pages.
Office Action, dated Mar. 28, 2013, regarding U.S. Appl. No. 12/854,671, 37 pages.
Office Action, dated Sep. 10, 2013, regarding U.S. Appl. No. 12/372,616, 25 pages.
Office Action, dated Sep. 12, 2013, regarding U.S. Appl. No. 12/701,033, 25 pages.
Office Action, dated Jul. 18, 2013, regarding U.S. Appl. No. 12/404,493, 42 pages.
Office Action, dated Aug. 28, 2013, regarding U.S. Appl. No. 12/560,569, 46 pages.
Notice of Allowance, dated Jul. 31, 2013, regarding U.S. Appl. No. 12/854,646, 19 pages.
Final Office Action, dated Jul. 12, 2013, regarding U.S. Appl. No. 12/854,671, 17 pages.
Final Office Action, dated Oct. 10, 2013, regarding U.S. Appl. No. 12/730,594, 33 pages.
Final Office Action, dated Dec. 13, 2013, regarding U.S. Appl. No. 12/404,493, 24 pages.
Notice of Allowance, dated Dec. 13, 2013, regarding U.S. Appl. No. 12/854,671, 12 pages.
Notice of Allowance, dated Apr. 9, 2014, regarding U.S. Appl. No. 12/404,493, 10 pages.
Final Office Action, dated Apr. 2, 2014, regarding U.S. Appl. No. 12/372,616, 24 pages.
Final Office Action, dated Feb. 28, 2014, regarding U.S. Appl. No. 12/560,569, 43 pages.
Notice of Allowance, dated Feb. 27, 2014, regarding U.S. Appl. No. 12/730,594, 11 pages.
Final Office Action, dated Feb. 21, 2014, regarding U.S. Appl. No. 12/701,033, 31 pages.
Final Office Action, dated Feb. 19, 2014, regarding U.S. Appl. No. 13/086,521, 18 pages.
Office Action, dated Sep. 16, 2014, regarding U.S. Appl. No. 12/560,569, 46 pages.
Office Action, dated Aug. 8, 2014, regarding U.S. Appl. No. 13/086,521, 20 pages.
Final Office Action, dated Jan. 14, 2015, regarding U.S. Appl. No. 13/086,521, 23 pages.
Final Office Action, dated Dec. 29, 2014, regarding U.S. Appl. No. 12/560,569, 17 pages.

* cited by examiner

AUTOMATED VISUAL INSPECTION SYSTEM

BACKGROUND INFORMATION

1. Field

The present disclosure relates generally to inspecting objects and, in particular, to inspecting an aircraft. Still more particularly, the present disclosure relates to a method and apparatus for automatically inspecting an aircraft on the ground.

2. Background

Aircraft and parts for aircraft are inspected during different phases of the life of the aircraft. For example, when an aircraft is being assembled, the different parts of the aircraft are inspected during various phases of assembly. Further, during testing and certification of an aircraft, inspections are made to determine whether different parts of the aircraft are performing as expected or desired.

During use of the aircraft, periodic checks are made after a certain time or usage. For example, a check may be made after about five to about 800 hours or about every three months or about 12 to about 18 months, depending on the type of inspection. The inspection on an aircraft may include a visual inspection of the exterior of an aircraft. In other cases, the inspection may involve removing different parts of the aircraft and inspecting those parts. The inspection may result in maintenance being performed on the aircraft.

Currently, these inspections are performed by people using instructions that identify parts and inconsistencies that a person should look for. These people are also referred to as maintenance operators. The results of these inspections are written down or entered into a database by the maintenance operator.

For example, in some inspections, an aircraft may be moved into a hangar. A maintenance operator may walk around the aircraft to determine whether any inconsistencies are present on the surface of the aircraft. These inconsistencies may include, for example, without limitation, a dent, a leak, missing rivets, or some other type of inconsistency.

This type of inspection requires larger amounts of time than desired. Additionally, the maintenance operators, who perform the inspections, need a level of training and experience that allow for the identification of inconsistencies with a desired level of accuracy. The amount of time, skill, and experience needed for maintenance operators results in a high cost in performing inspections of aircraft.

Therefore, it would be advantageous to have a method and apparatus that takes into account one or more of the issues discussed above, as well as other possible issues.

SUMMARY

In one illustrative embodiment, a method is provided for inspecting an object. In response to a presence of the object in an inspection area, a volume that contains the object is identified. The volume has a plurality of portions. A number of sensor systems is assigned to the plurality of portions of the volume. Each sensor system in the number of sensors systems is assigned to a number of portions in the plurality of portions of the volume based on whether each sensor system is able to generate data with a desired level of quality about a surface of the object in a particular portion in the plurality of portions. The data about the surface of the object is generated using the number of sensor systems assigned to the plurality of portions of the volume. A determination is made as to whether a number of inconsistencies is present on the surface of the object using the data.

In another illustrative embodiment, an apparatus comprises a number of sensor systems located in an inspection area and a computer system in communication with the number of sensor systems. The computer system is configured to identify a volume that contains an object. The volume has a plurality of portions. The computer system is configured to assign the number of sensor systems to the plurality of portions of the volume. Each sensor system in the number of sensors systems is assigned to a number of portions in the plurality of portions of the volume based on whether each sensor system is able to generate data with a desired level of quality about a surface of the object in a particular portion in the plurality of portions. The computer system is configured to generate the data about the surface of the object using the number of sensor systems assigned to the plurality of portions of the volume. The computer system is configured to determine whether a number of inconsistencies is present on the surface of the object.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
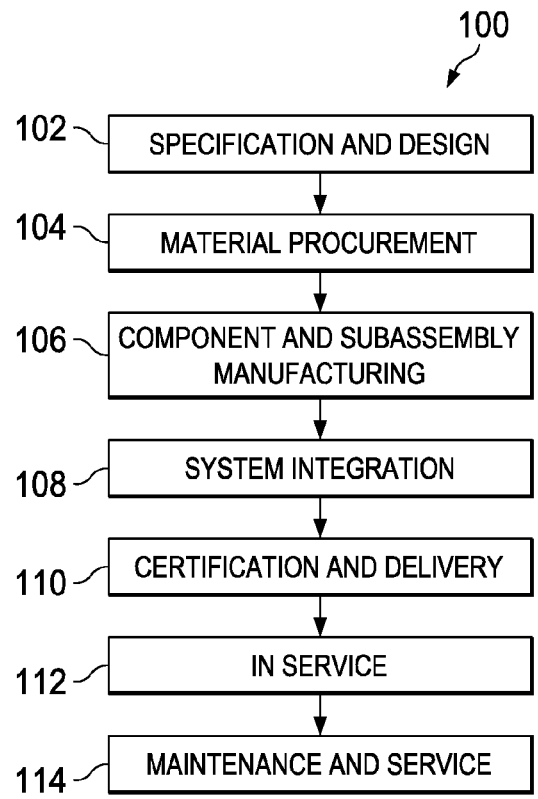
FIG. 1 is an illustration of an aircraft manufacturing and service method in accordance with an illustrative embodiment.
Figure 2:
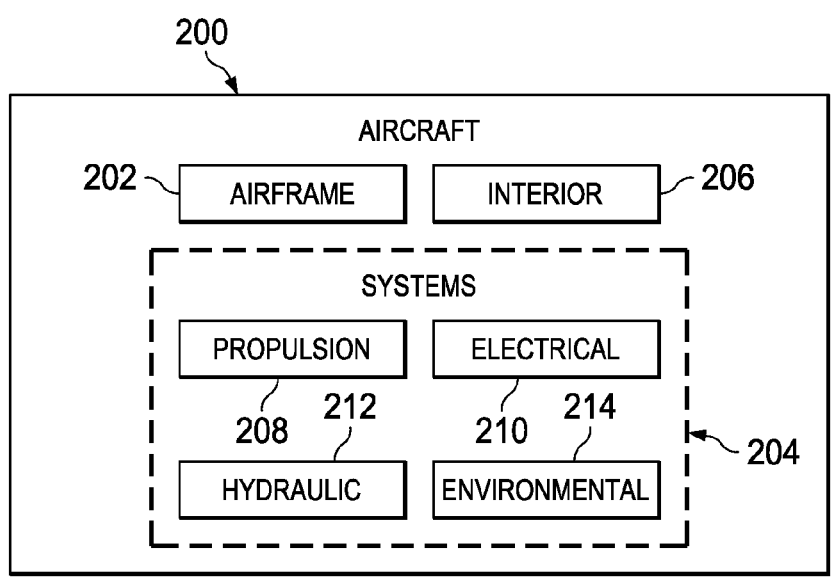
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive and/or ship industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of and/or reduce the cost of aircraft 200.

The different illustrative embodiments recognize and take into account a number of considerations. For example, the different illustrative embodiments recognize and take into account that the inspection of aircraft may not be as consistent as desired. As one illustrative example, different levels of experience and skill in maintenance operators may result in different maintenance operators identifying different inconsistencies on the same aircraft. In other words, one maintenance operator may not see an inconsistency that another maintenance operator may see, depending on the difference in skill and experience.

Even with the same skill and experience, the different illustrative embodiments also recognize that maintenance operators may miss an inconsistency entirely or make a judgment call that an inconsistency is not present. With the same aircraft, another maintenance operator may determine that the inconsistency is present.

The different illustrative embodiments recognize and take into account that with maintenance operators performing inspections, it may be difficult to see upper portions of an aircraft, such as the top of an aircraft. As a result, some inconsistencies may not be detected or identified by the maintenance operators. A maintenance operator may be required to climb a ladder or use a lift to see upper portions of an aircraft. The different illustrative embodiments recognize and take into account that this type of process increases the time needed to inspect the aircraft, as well as requires equipment that allows for maintenance operators to see higher portions of the aircraft that cannot be easily seen from the ground.

Thus, the different illustrative embodiments provide a method and apparatus for inspecting objects, such as aircraft. In response to the presence of an object in an inspection area, a volume is identified that contains the object. This volume has a plurality of portions. A number of sensor systems are assigned to the plurality of portions of the volume. Each sensor system in the number of sensor systems may be assigned to a number of portions in the plurality of portions of the volume.

This assignment of the number of sensors is based on whether each sensor is able to generate data with a desired level of quality about a surface of the object in a particular portion in the plurality of portions. The data is then generated about the surface of the object using the number of sensor systems assigned to the plurality of portions of the volume. A determination is made as to whether a number of inconsistencies is present on the surface of the object. This information may then be used to perform maintenance operations and/or other operations on the object.

Figure 3:
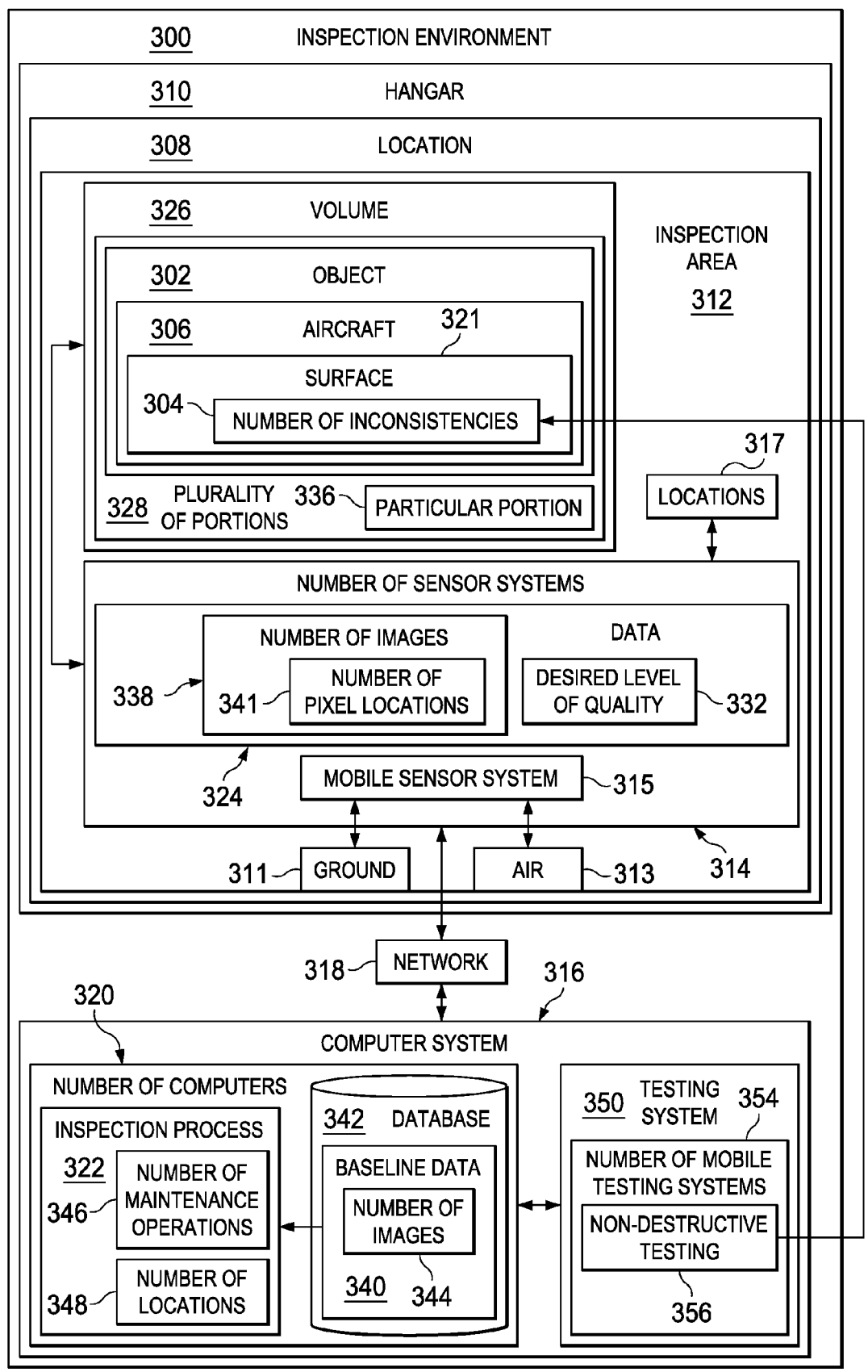
FIG. 3 is an illustration of an inspection environment in accordance with an illustrative embodiment.

With reference now to FIG. 3, an illustration of an inspection environment is depicted in accordance with an illustrative embodiment. In these illustrative examples, inspection environment 300 may be used during different phases of aircraft manufacturing and service method 100 in FIG. 1.

Inspection environment 300 in FIG. 3 is used to inspect object 302 for number of inconsistencies 304. In these illustrative examples, object 302 is aircraft 306. Aircraft 306 may be implemented using, for example, aircraft 200 in FIG. 2. In these illustrative examples, number of inconsistencies 304 may include, for example, without limitation, at least one of a dent, a crack, a leak, and/or some other type of inconsistency.

In these illustrative examples, inspection of aircraft 306 takes place in location 308. In particular, location 308 may be in hangar 310 in these examples. Location 308 in hangar 310 forms inspection area 312 for inspecting aircraft 306.

Number of sensor systems 314 is associated with inspection area 312 in these illustrative examples. In these depicted examples, number of sensor systems 314 may include mobile sensor system 315. Mobile sensor system 315 is configured to move along ground 311 or in air 313 in inspection area 312 in hangar 310.

Number of sensor systems 314 may be placed in locations 317 in hangar 310 such that substantially all of surface 321 of object 302 can be detected by number of sensor systems 314. In this manner, the different illustrative embodiments provide a capability to inspect all of object 302 more thoroughly as compared to currently used methods. This type of improvement may be especially evident when object 302 takes the form of aircraft 306.

Computer system 316, in these illustrative examples, is in communication with number of sensor systems 314. Computer system 316 communicates with number of sensor systems 314 through network 318. Network 318 may include wired communications links, wireless communications links, or a combination of the two.

In these illustrative examples, computer system 316 comprises number of computers 320. Number of computers 320 may be in communication with each other through network 318 or a different network, depending on the particular implementation.

Inspection process 322 runs on one or more of number of computers 320. In other words, inspection process 322 may be distributed among different computers in number of computers 320. Further, inspection process 322 may run as program code, hardware, or a combination of the two on number of computers 320. In these illustrative examples, number of sensor systems 314 generates data 324, which is sent to inspection process 322.

In these illustrative examples, inspection process 322 identifies volume 326 in response to a presence of object 302 in inspection area 312. This initiation of inspection process 322 may be performed automatically in response to the presence of object 302. In other illustrative examples, inspection process 322 may begin inspecting object 302 when object 302 is present in inspection area 312 and an input is received to start the inspection. This input may be user input or some other suitable type of input.

Volume 326 contains object 302. In other words, object 302 is located inside of volume 326. Inspection process 322 assigns number of sensor systems 314 to plurality of portions 328 of volume 326. The assignment of number of sensor systems 314 to plurality of portions 328 is based on each sensor system being capable of generating data 324 with desired level of quality 332 about surface 321 of object 302 in particular portion 336 in plurality of portions 328.

In these illustrative examples, data 324 generated by number of sensor systems 314 takes the form of number of images 338. Number of images 338 may include still images, images for a video, a combination of the two, or some other suitable type of image.

In these illustrative examples, number of images 338 may be made by number of sensor systems 314 using visual light, infrared light, and/or other suitable types of light. Further, number of images 338 also may be generated by a laser beam directed toward surface 321 of object 302 with data 324 forming measurements about distance to surface 321 to generate images in number of images 338. Of course, other types of images may be used, depending on the particular implementation.

In these depicted examples, inspection process 322 compares data 324 with baseline data 340 in database 342. Baseline data 340 is obtained for object 302 at a time prior to the generation of data 324. In other words, baseline data 340 is obtained for object 302 at a time prior to inspection of object 302 for number of inconsistencies 304.

Baseline data 340 may take the form of number of images 344 generated after object 302 was manufactured. In other examples, number of images 344 may be images of object 302 taken before a current use of object 302. In still other illustrative examples, baseline data 340 may be generated from a model of object 302.

Inspection process 322 determines whether number of inconsistencies 304 is present on surface 321 of object 302 through the comparison of data 324 with baseline data 340. For example, inspection process 322 may compare data 324 to baseline data 340 to identify number of pixel locations 341 in number of images 338 where data 324 does not match baseline data 340 within a selected threshold. In this manner, number of inconsistencies 304 is identified at number of pixel locations 341 in number of images 338.

In these depicted examples, each pixel location in number of pixel locations 341 is defined using an x-y coordinate system for the pixels in image with the pixel location. Inspection process 322 identifies the locations on surface 321 of aircraft 306 that correspond to the locations in number of images 338. In this manner, inspection process 322 identifies number of locations 348 that correspond to number of pixel locations 341. Number of locations 348 includes the actual locations on surface 321 of aircraft 306 for number of inconsistencies 304.

The comparison between data 324 and baseline data 340 may be made using a number of different techniques. For example, at least one of image segmentation, edge detection, image enhancement, geometric pattern matching, wavelet transformation, graph-based algorithms, and other suitable techniques are used to compare data 324 to baseline data 340.

In response to a determination that a number of inconsistencies are present on surface 321 of object 302, inspection process 322 may identify number of maintenance operations 346 to perform on object 302. These maintenance operations may include, for example, without limitation, replacements of parts, reworking of parts, additional inspections, and/or other suitable types of maintenance operations.

For example, inspection process 322 may control testing system 350 to perform additional inspections in number of locations 348 where number of inconsistencies 304 has been identified. In these illustrative examples, testing system 350 may include number of mobile testing systems 354. Number of mobile testing systems 354 may travel between number of locations 348 to perform additional inspections on number of inconsistencies 304. In these illustrative examples, number of mobile testing systems 354 performs non-destructive testing 356 at number of locations 348 where number of inconsistencies 304 have been identified.

In these depicted examples, non-destructive testing 356 includes a number of different types of testing techniques that do not generate more inconsistencies or cause undesired changes to object 302. For example, non-destructive testing 356 may include at least one of testing using ultrasound signals, magnetic particles, liquid penetration, x-rays, eddy currents, and/or other suitable techniques to perform further inspection of object 302.

In this manner, the different illustrative embodiments provide an improved method and apparatus over current inspection systems for identifying inconsistencies in objects, such as aircraft. In these illustrative examples, time and effort may be saved for objects, such as aircraft 306. In particular, the inspection of object 302 in the form of aircraft 306 may be performed quickly and with more accuracy using number of sensor systems 314 and inspection process 322 than by using human maintenance operators.

The illustration of inspection environment 300 in FIG. 3 is not meant to imply physical or architectural limitations to a manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, the different illustrative embodiments may be applied to objects other than aircraft 306. For example, the different illustrative embodiments may be applied to other types of objects, such as, for example, without limitation, a land-based structure, an aquatic-based structure, a space-based structure, and/or some other suitable type of object. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, an engine, a flap, a portion of a fuselage, a manufacturing facility, a building, and/or some other suitable object.

Additionally, these inspections may be performed at different times in addition to performing maintenance on an aircraft. For example, the different illustrative embodiments may be applied to parts manufactured for aircraft 306 and during testing and certification of aircraft 306. Additionally, the different illustrative embodiments may be applied to inspecting the interior of an aircraft. For example, number of sensor systems 314 may be present inside of aircraft 306 or located on mobile platforms that move within aircraft 306 to inspect the surface of the interior of aircraft 306.

Figure 4:
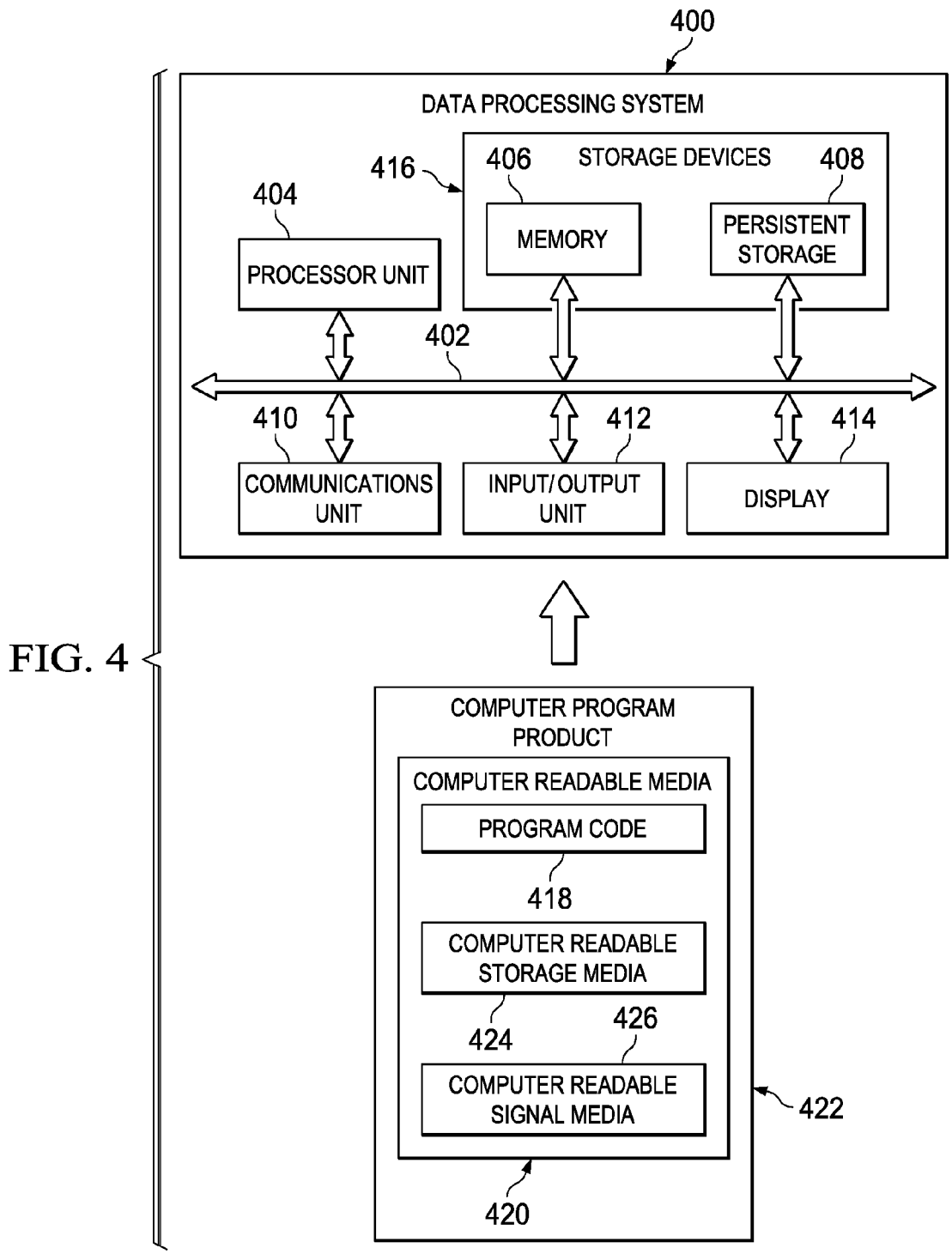
FIG. 4 is an illustration of a data processing system in accordance with an illustrative embodiment.

Turning now to FIG. 4, an illustration of a data processing system is depicted in accordance with an illustrative embodiment. In this illustrative example, data processing system 400 is an example of one implementation for one or more computers in number of computes 320 in computer system 316 in FIG. 3.

As depicted, data processing system 400 includes communications fabric 402, which provides communications between processor unit 404, memory 406, persistent storage 408, communications unit 410, input/output (I/O) unit 412, and display 414. Data processing system 400 is an example of a data processing system that may be used to implement number of computers 320 in computer system 316 in FIG. 3.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408.

Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
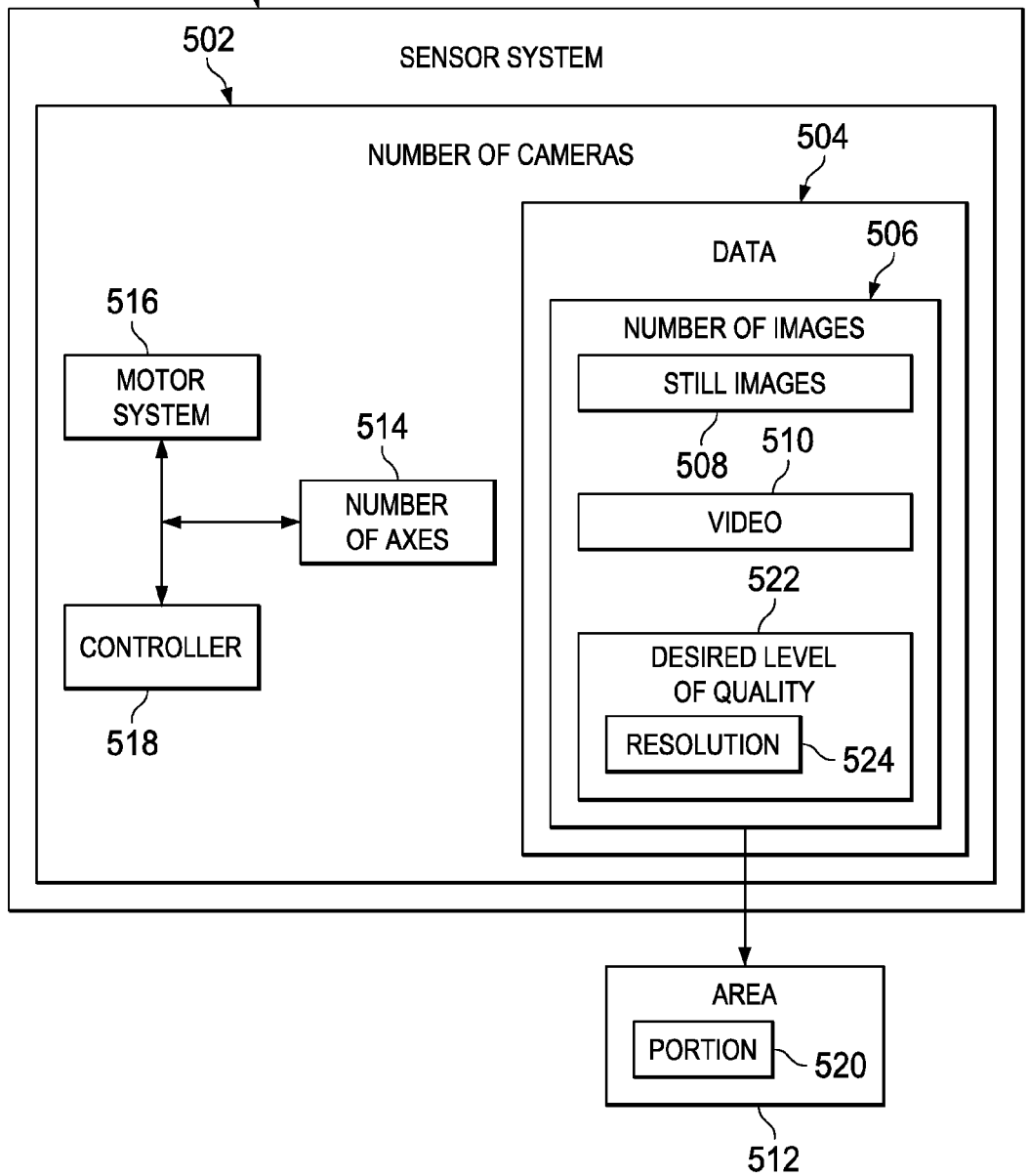
FIG. 5 is an illustration of a sensor system in accordance with an illustrative embodiment.

With reference now to FIG. 5, an illustration of a sensor system is depicted in accordance with an illustrative embodiment. In this illustrative example, sensor system 500 is an example of a sensor system that may be used to implement a sensor system in number of sensor systems 314 in FIG. 3.

As depicted in this example, sensor system 500 comprises number of cameras 502. Number of cameras 502 is configured to generate data 504 in the form of number of images 506. Number of images 506 may be, for example, without limitation, at least one of still images 508, video 510, and/or other types of suitable images.

In these illustrative examples, number of cameras 502 may generate number of images 506 for area 512. Number of cameras 502 may be fixed or may be moveable about number of axes 514.

This movement over number of axes 514 is controlled through motor system 516 and controller 518. Further, the movement about number of axes 514 may be referred to as pan and tilt in these illustrative examples.

Although number of cameras 502 may be able to generate number of images 506 over area 512, data 504 may be generated for only portion 520 of area 512. Portion 520 of area 512 may provide number of images 506 with desired level of quality 522.

In these illustrative examples, desired level of quality 522 takes the form of resolution 524. The resolution of a camera in number of cameras 502 may be measured in pixels and is a measure of a quality of an image. The quality of an image may be based on features, such as, for example, without limitation, sharpness, color intensity, color contrast, distortion, compression, noise, dynamic range, and/or other suitable features. As one illustrative example, as the resolution of an image increases, features, such as the sharpness of an image and the ability to make out objects in an image, also increase.

Figure 6:
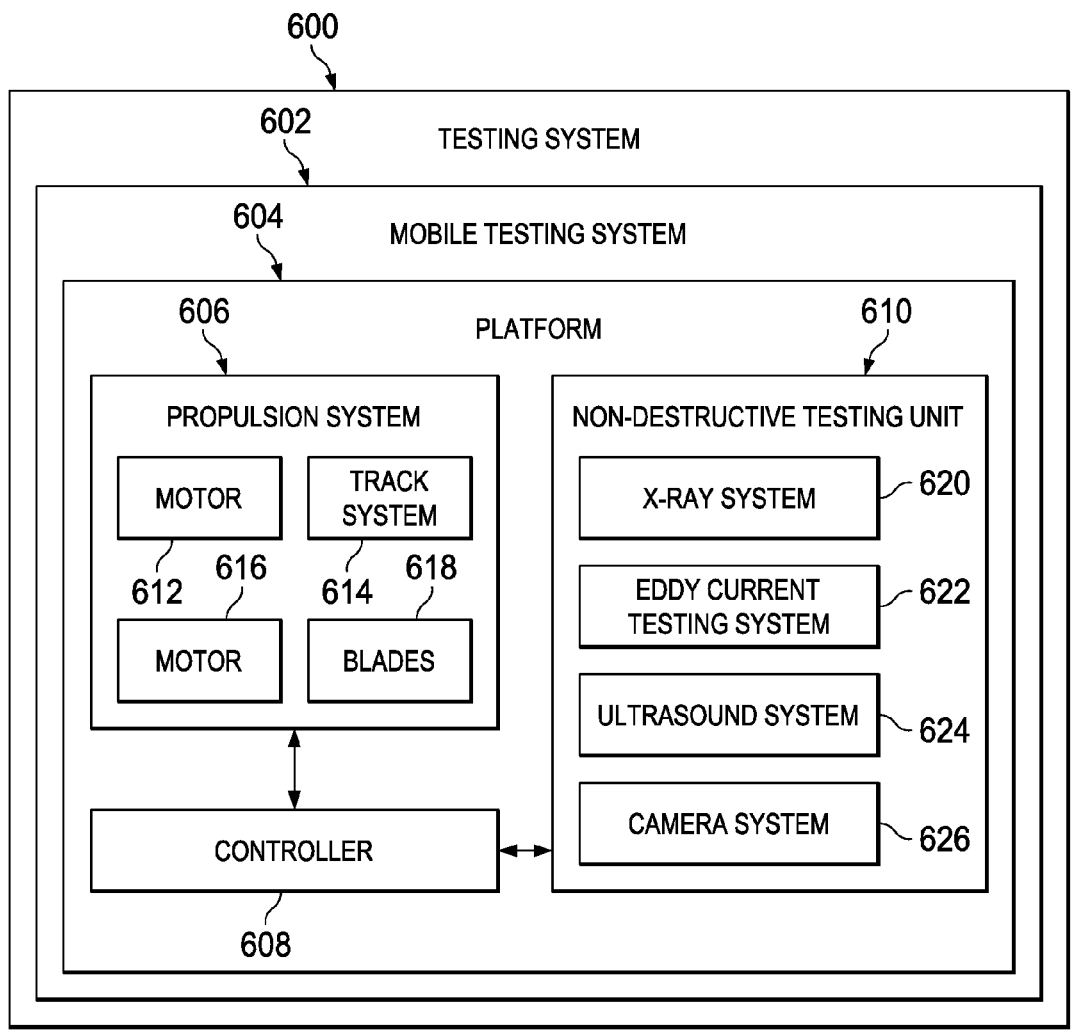
FIG. 6 is an illustration of a testing system in accordance with an illustrative embodiment.

With reference now to FIG. 6, an illustration of a testing system is depicted in accordance with an illustrative embodiment. In this illustrative example, testing system 600 is an example of one implementation for testing system 350 in FIG. 3.

In this depicted example, testing system 600 is mobile testing system 602. As illustrated, mobile testing system 602 comprises platform 604, propulsion system 606, controller 608, and non-destructive testing unit 610. Platform 604 provides a structure for other components in mobile testing system 602. Propulsion system 606, controller 608, and non-destructive testing unit 610 are associated with platform 604.

Propulsion system 606 is configured to move mobile testing system 602. Propulsion system 606 may move mobile testing system 602 on the ground, in the air, or a combination of the two.

For example, propulsion system 606 may comprise motor 612 and track system 614. Motor 612 causes track system 614 to move platform 604 on the ground. In other illustrative examples, propulsion system 606 may comprise motor 616 and blades 618. Motor 616 is configured to rotate blades 618 to provide a lift in movement of mobile testing system 602.

Non-destructive testing unit 610 may comprise at least one of x-ray system 620, eddy current testing system 622, ultrasound system 624, camera system 626, and/or other suitable types of non-destructive testing systems. In this illustrative example, x-ray systems 620 may be configured to generate images using x-rays. Eddy current testing system 622 may be used to detect inconsistencies in conductive materials through electromagnetic induction. Ultrasound system 624 may be configured to send signals through materials to identify inconsistencies.

Camera system 626 may have a higher resolution than cameras in number of sensor systems 314 in FIG. 3. By moving camera system 626 to a location of a detected inconsistency, more detail of the inconsistency may be identified. In this manner, camera system 626 may be used to perform additional inspection of the detected inconsistency.

Controller 608 may be a data processing system, such as data processing system 400 in FIG. 4, or a processor unit. Controller 608 is configured to control mobile testing system 602. For example, controller 608 may control the movement of mobile testing system 602. Further, controller 608 may control the generation of data by non-destructive testing unit 610. The movement and data generated by mobile testing system 602 may be controlled through instructions or commands received from inspection process 322 in FIG. 3.

Figure 7:
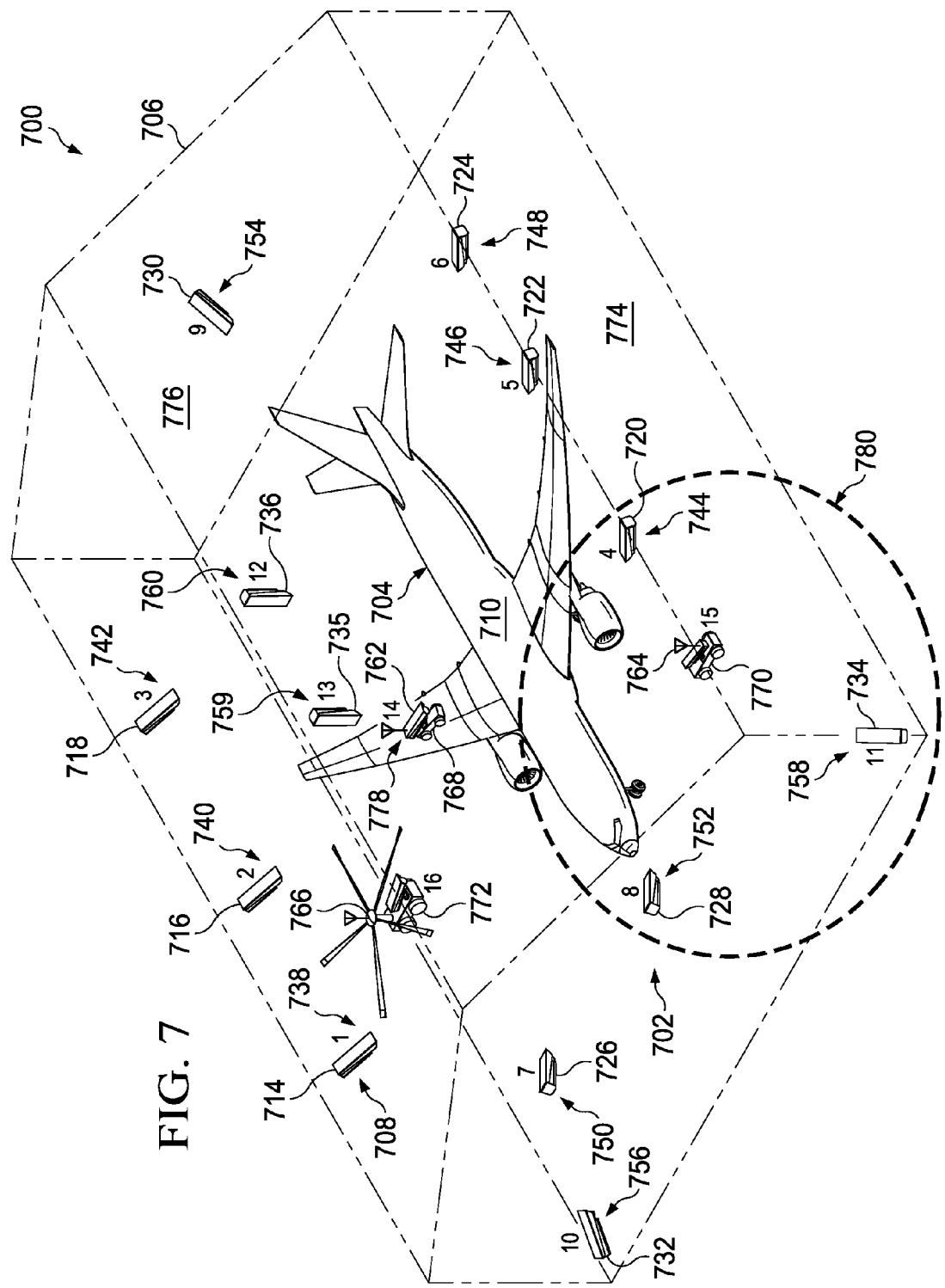
FIG. 7 is an illustration of a perspective view of an inspection environment in accordance with an illustrative embodiment.

With reference now to FIG. 7, an illustration of a perspective view of an inspection environment is depicted in accordance with an illustrative embodiment. In this illustrative example, inspection environment 700 is an example of one implementation for inspection environment 300 in FIG. 3.

As depicted, inspection environment 700 includes inspection area 702 and aircraft 704 in inspection area 702. Inspection area 702 is in hangar 706 in this illustrative example. As illustrated, sensor systems 708 are located in inspection area 702. Sensor systems 708 are configured to generate data about surface 710 of aircraft 704. In some illustrative examples, sensor systems 708 may be configured to generate data about other portions of aircraft 704, such as inner portions of aircraft 704. For example, sensor systems 708 may include x-ray systems.

In this illustrative example, sensor systems 708 include camera systems 714, 716, 718, 720, 722, 724, 726, 728, 730, 732, 734, 735, 736, 762, 764, and 766. These camera systems may be implemented using, for example, a camera in number of cameras 502 in FIG. 5. In this illustrative example, these camera systems generate images for surface 710 of aircraft 704. In particular, these camera systems generate video.

Camera systems 714, 716, 718, 720, 722, 724, 726, 728, 730, 732, 734, 735, and 736 are in locations in hangar 706 in this depicted example. For example, camera systems 714, 716, 718, 720, 722, 724, 726, 728, 730, 732, 734, 735, and 736 are in locations 738, 740, 742, 744, 746, 748, 750, 752, 754, 756, 758, 759, and 760, respectively, in hangar 706. These locations are fixed locations for the camera systems in this depicted example.

As illustrated, sensor systems 708 also include camera systems 762, 764, and 766. Camera systems 762, 764, and 766 are connected to robots 768, 770, and 772, respectively. These robots allow camera systems 762, 764, and 766 to move within inspection area 702.

For example, robot 768 and robot 770 are configured to move camera system 762 and camera system 764, respectively, on a surface. This surface may be, for example, ground 774 of hangar 706 or surface 710 of aircraft 704. For example, robot 768 is in location 778 on the surface of a wing for aircraft 704.

In this illustrative example, robot 772 is configured to move camera system 766 in air 776 in hangar 706. In other words, robot 772 flies such that camera system 766 moves in air 776. In some illustrative examples, robot 772 may be configured to pick up, carry, and deploy a robot, such as robot 768, with camera system 762 on surface 710 of aircraft 704. In this manner, camera systems 762, 764, and 766 are capable of moving to different locations within inspection area 702 to generate images for different portions of surface 710 of aircraft 704.

The images generated by sensor systems 708 may be sent to a computer system, such as computer system 316 in FIG. 3, for processing. The images may be used to determine whether inconsistencies are present on surface 710 of aircraft 704. Portion 780 of inspection environment 700 is illustrated in an enlarged view in FIG. 8 below.

Figure 8:
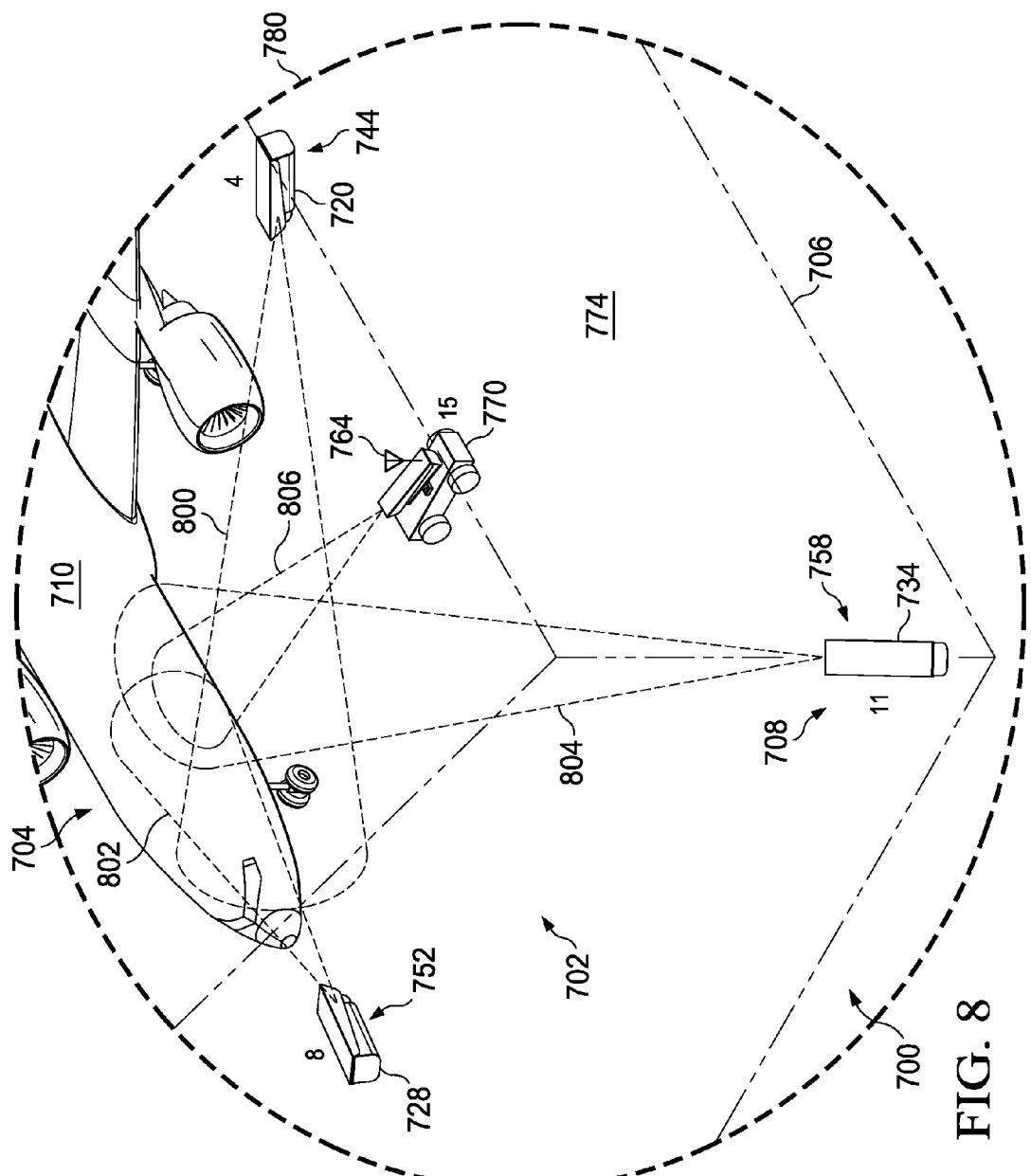
FIG. 8 is an illustration of an enlarged perspective view of a portion of an inspection environment in accordance with an illustrative embodiment.

Turning now to FIG. 8, an illustration of an enlarged perspective view of a portion of an inspection environment is depicted in accordance with an illustrative embodiment. In this illustrative example, portion 780 of inspection environment 700 from FIG. 7 is depicted.

As depicted, camera system 720 has field of view 800. Camera system 728 has field of view 802. Camera system 734 has field of view 804. Further, camera system 764 has field of view 806. The locations of camera systems 720, 728, 734, and 764 allow images to be generated for different portions of surface 710 of aircraft 704.

Figure 9:
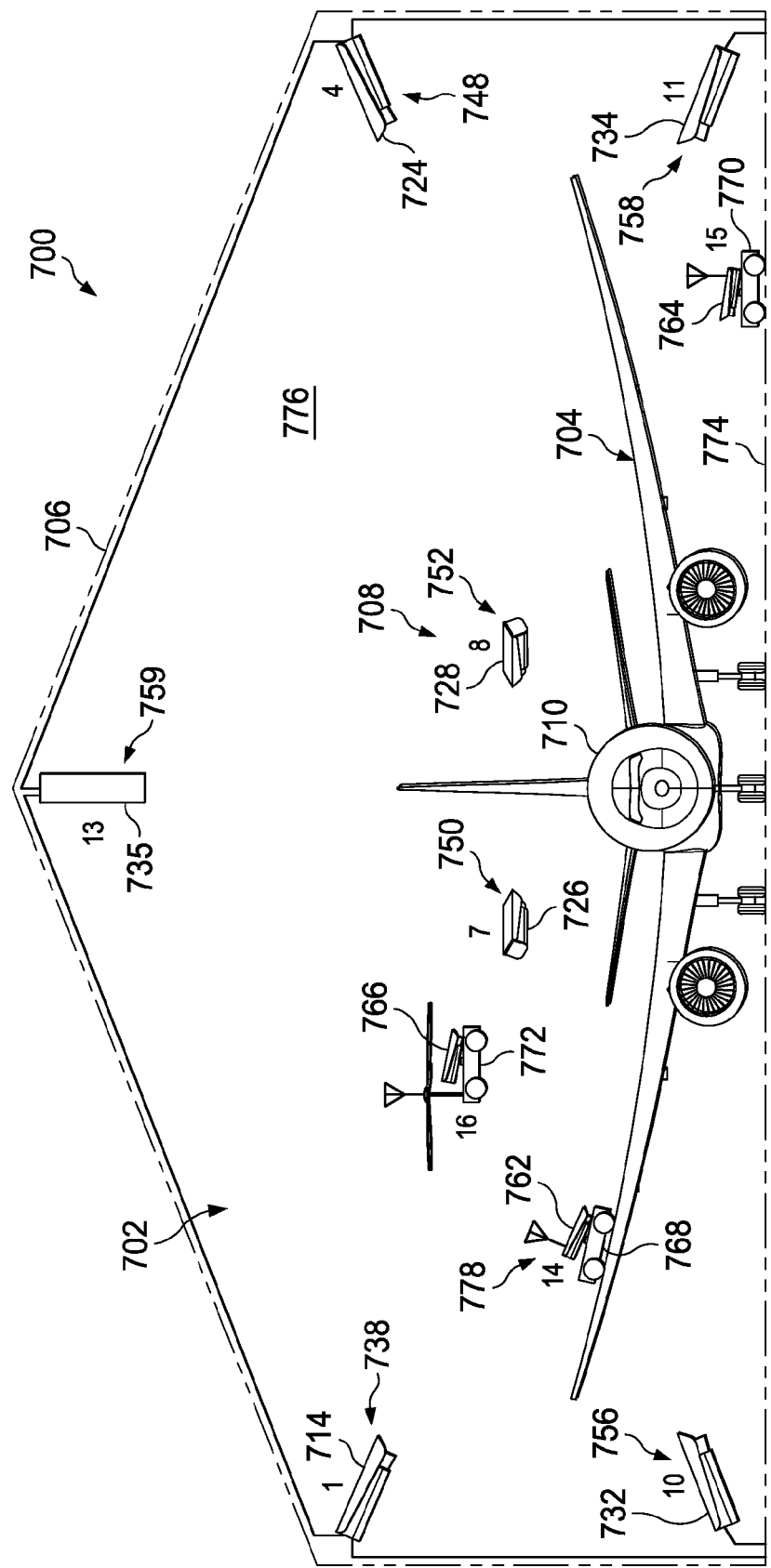
FIG. 9 is an illustration of a front view of an inspection environment in accordance with an illustrative embodiment.

With reference now to FIG. 9, an illustration of a front view of an inspection environment is depicted in accordance with an illustrative embodiment. In this illustrative example, inspection environment 700 from FIG. 7 is depicted from a front view of inspection area 702 and aircraft 704 in inspection area 702.

Figure 10:
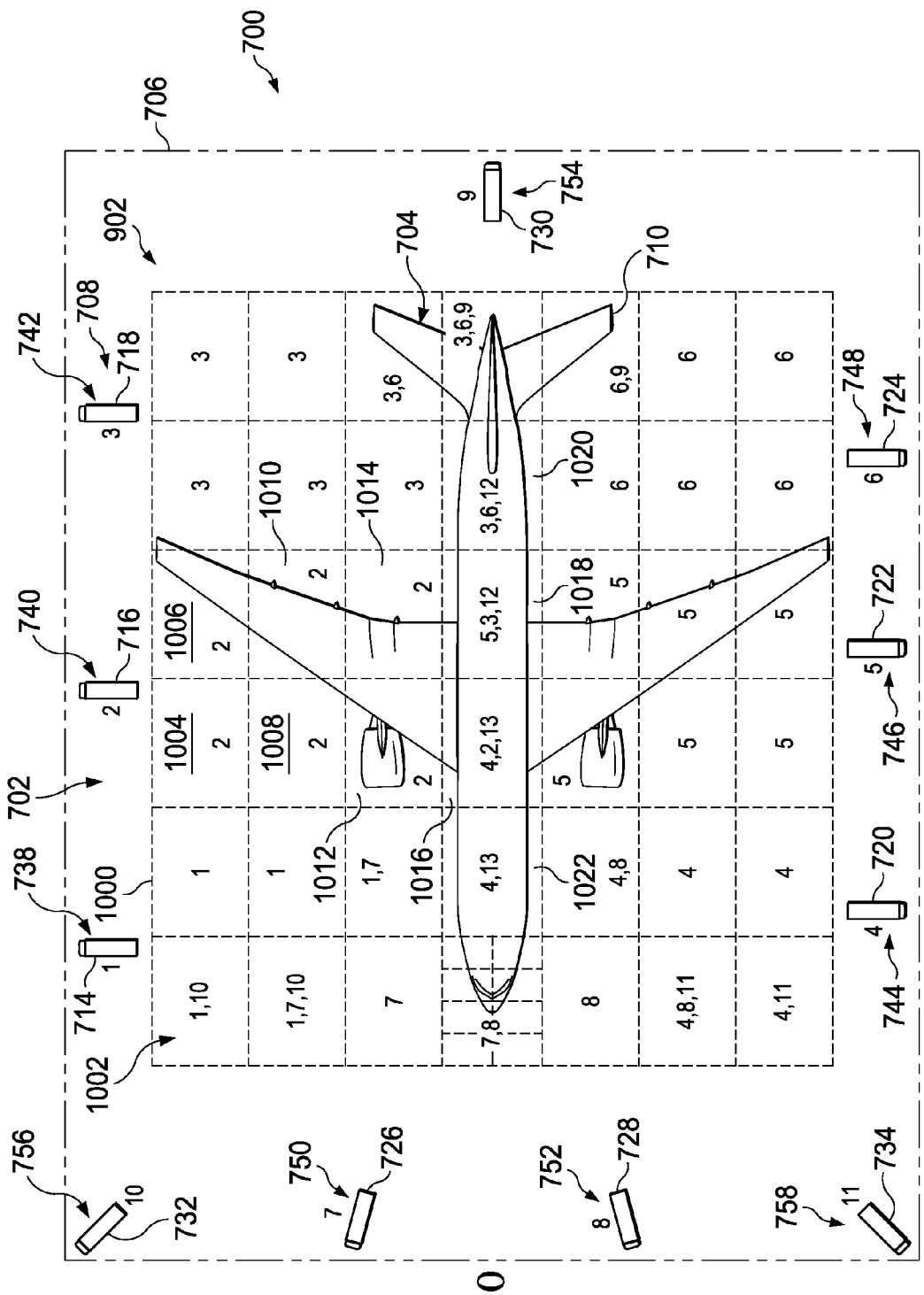
FIG. 10 is an illustration of a top view of a volume in an inspection area in accordance with an illustrative embodiment.

Turning now to FIG. 10, an illustration of a top view of a volume in an inspection area is depicted in accordance with an illustrative embodiment. In this illustrative example, volume 1000 is identified within inspection area 702 in inspection environment 700 from FIG. 7.

In this illustrative example, volume 1000 comprises plurality of portions 1002. Plurality of portions 1002 is selected to cover substantially all of surface 710 of aircraft 704. In other words, aircraft 704 is contained within plurality of portions 1002.

As illustrated, each camera system in sensor systems 708 is assigned to a number of portions within plurality of portions 1002. In this manner, each camera system generates images for surface 710 of aircraft 704 within the field of view of each camera system in the number of portions assigned to each camera system. As one illustrative example, camera system 716 is assigned to portions 1004, 1006, 1008, 1010, 1012, 1014, 1016, and 1018.

Further, in this depicted example, each camera system is assigned to the number of portions in plurality of portions 1002 based on whether each camera system is able to generate images with a desired level of quality of surface 710 of aircraft 704 in a particular portion in plurality of portions 1002. The quality of the images generated by each camera system may depend on the distance from each camera system from surface 710 of aircraft 704.

In this illustrative example, camera system 735 and camera system 736 in FIG. 7 are not shown to provide a clearer view of plurality of portions 1002 in volume 1000. Camera system 735 in FIG. 7 is assigned to portion 1016 and portion 1022 in plurality of portions 1002 in this depicted example. Further, camera system 736 in FIG. 7 is assigned to portion 1018 and portion 1020.

Figure 11:
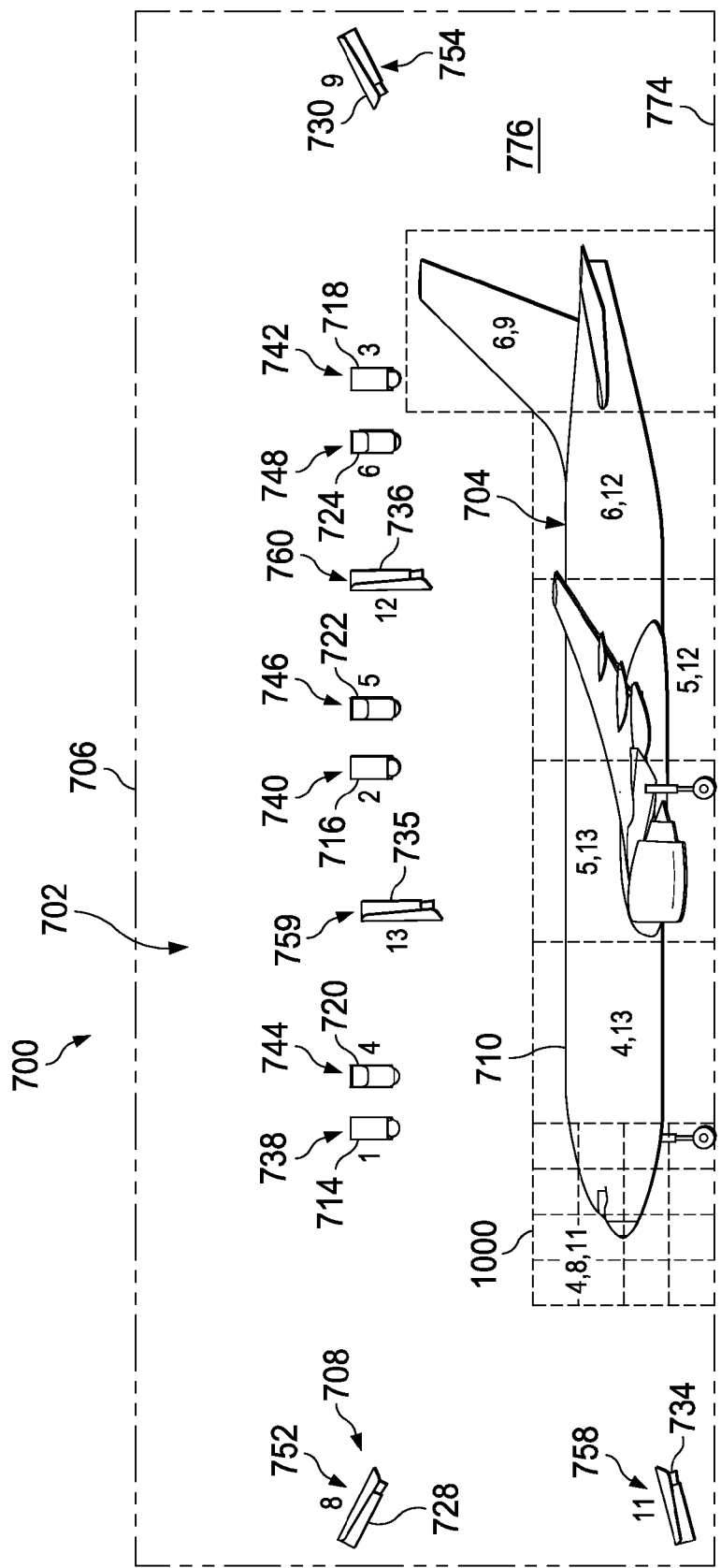
FIG. 11 is an illustration of a side view of a volume in an inspection area in accordance with an illustrative embodiment.

With reference now to FIG. 11, an illustration of a side view of a volume in an inspection area is depicted in accordance with an illustrative embodiment. In this illustrative example, a side view of volume 1000 in FIG. 10 is depicted. As depicted, only a portion of plurality of portions 1002 from FIG. 10 is depicted.

Figure 12:
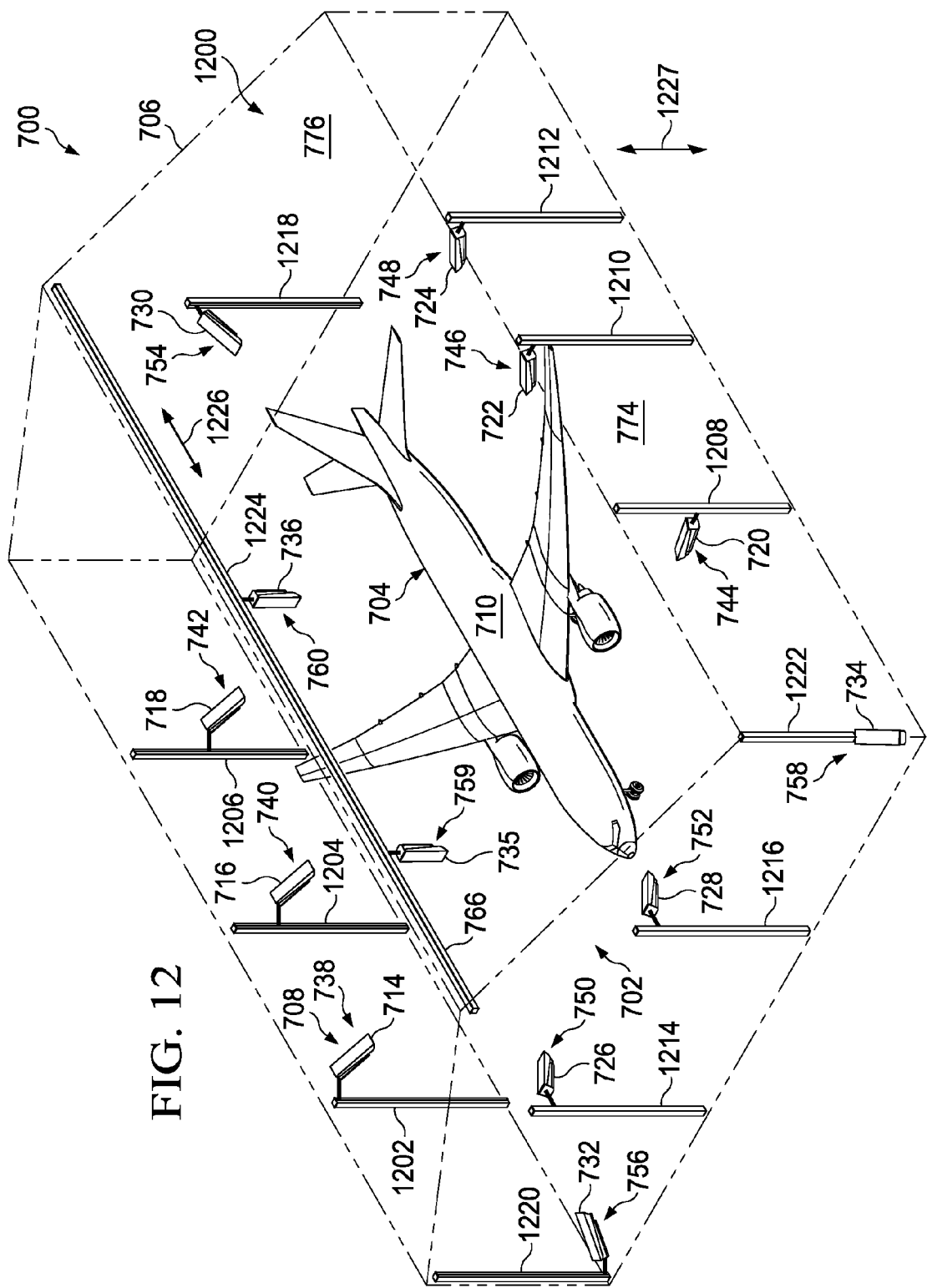
FIG. 12 is an illustration of a perspective view of an inspection environment in accordance with an illustrative embodiment.

With reference now to FIG. 12, an illustration of a perspective view of an inspection environment is depicted in accordance with an illustrative embodiment. In this illustrative example, inspection environment 700 from FIG. 7 is depicted having rail system 1200.

As depicted, rail system 1200 includes rails 1202, 1204, 1206, 1208, 1210, 1212, 1214, 1216, 1218, 1220, 1222, and 1224. Camera systems 714, 716, 718, 720, 722, 724, 726, 728, 730, 732, and 734 are configured to move in the direction of arrow 1227 along rails 1202, 1204, 1206, 1208, 1210, 1212, 1214, 1216, 1218, 1220, 1222, and 1224, respectively. Camera system 735 and camera system 736 are configured to move in the direction of arrow 1226 along rail 1224.

In this manner, the locations of these camera systems may be changed. The locations of the camera systems may be changed to reassign the camera systems to different portions in a volume identified within an inspection area, such as volume 1000 in FIG. 10. The locations of the camera systems may also be changed to account for the size and/or shape of different aircraft and/or other structures located within inspection area 702 in hangar 706.

Figure 13:
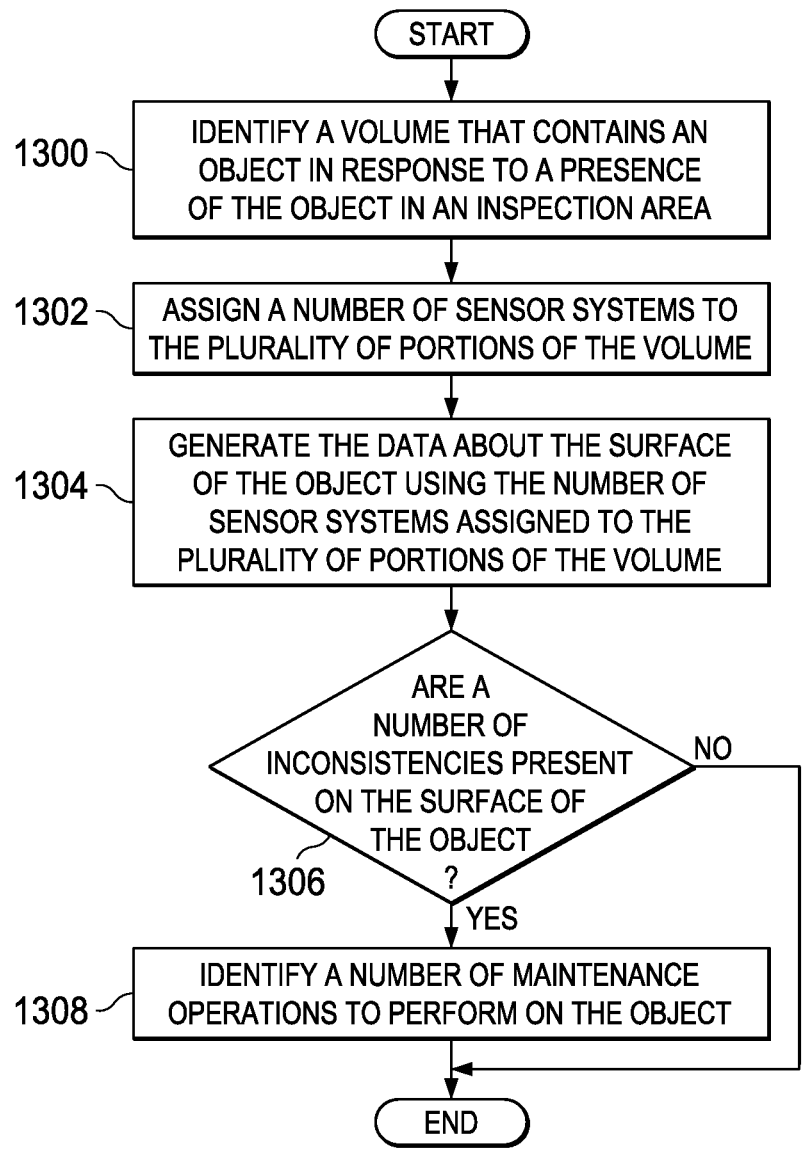
FIG. 13 is an illustration of a flowchart of a process for inspecting an object in accordance with an illustrative embodiment.

With reference now to FIG. 13, an illustration of a flowchart of a process for inspecting an object is depicted in accordance with an illustrative embodiment. The process illustrated in FIG. 13 may be implemented in inspection environment 300 in FIG. 3.

The process begins by identifying a volume that contains an object in response to a presence of the object in an inspection area (operation 1300). The volume has a plurality of portions. The volume may be, for example, volume 1000 with plurality of portions 1002 in FIG. 10.

The process then assigns a number of sensor systems to the plurality of portions of the volume (operation 1302). Each sensor system in the number of sensor systems is assigned to a number of portions in the plurality of portions of the volume based on whether each sensor system is able to generate data with a desired level of quality about a surface of the object in a particular portion in the plurality of portions. In this illustrative example, the number of sensor systems may be camera systems configured to generate data in the form of still images and/or video.

Thereafter, the process generates the data about the surface of the object using the number of sensor systems assigned to the plurality of portions of the volume (operation 1304). The process then determines whether a number of inconsistencies are present on the surface of the object using the data (operation 1306). Operation 1306 is performed by comparing the data to baseline data, such as baseline data 340 in FIG. 3, in these examples.

If a number of inconsistencies are not present on the surface of the object, the process terminates. Otherwise, if a number of inconsistencies are present on the surface of the object, the process identifies a number of maintenance operations to perform on the object (operation 1308), with the process terminating thereafter.

The number of maintenance operations may include, for example, reworking the surface of the object, repairing the surface of the object, replacing a part associated with the surface of the object, performing additional inspection of the number of inconsistencies, and/or other suitable operations. In this illustrative example, operation 1308 may also include initiating the number of maintenance operations identified. For example, in operation 1308, if additional inspection of the number of inconsistencies is identified, the process may send commands to a mobile testing system to send the mobile testing system to the number of inconsistencies.

The flowchart and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different illustrative embodiments provide a method and apparatus for inspecting objects, such as aircraft. In response to the presence of an object in an inspection area, a volume is identified that contains the object. This volume has a plurality of portions. A number of sensor systems are assigned to the plurality of portions of the volume. Each sensor system in the number of sensor systems may be assigned to a number of portions in the plurality of portions of the volume. This assignment of the number of sensors is based on whether each sensor is able to generate data with a desired level of quality about a surface of the object in a particular portion in the plurality of portions. The data is then generated about the surface of the object using the number of sensor systems assigned to the plurality of portions of the volume. A determination is made as to whether a number of inconsistencies is present on the surface of the object. This information may then be used to perform maintenance operations and/or other operations on the object.

In this manner, the different illustrative embodiments reduce the time, effort, and/or equipment needed to inspect an object, such as an aircraft. With the use of a number of sensor systems assigned to generate data with a desired quality for particular portions of a volume in an inspection area that contains the object, inspection of the object may be made easier, less time-consuming, more accurate, and/or more consistent as compared to currently available methods of inspection.

The different illustrative embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting an object, the method comprising:
    identifying, using a sensor system, a volume occupied by the object such that the sensor system comprises a mobile sensor system that moves a sensor of the mobile sensor system in the volume while generating pixel data about the object via a first robot, and a second robot that picks up, carries, and deploys the first robot on the object;
    subsequently, using a computer system, dividing the volume into a plurality of portions and assigning a sensor in the sensor system to imaging a number of portions in the plurality of portions based upon a pixel capability of the sensor, the plurality of portions covering substantially all of a surface of the object and the sensor system generating pixel data for substantially all of the surface of the object, such that each pixel identifies a corresponding location on the object;
    identifying, via the computer system analyzing images generated by the sensor, the object and baseline data for the object;
    determining, based upon the computer system comparing the pixel data to baseline data, a presence of an inconsistency on the surface of the object;
    the computer system subsequently selecting, based upon the inconsistency, and deploying a testing system to a portion containing the inconsistency, the testing system comprising a greater resolution than the sensor; and
    the testing system performing testing on the portion containing the inconsistency.

2. The method of claim 1 further comprising:
    responsive to determining the presence of the inconsistency, identifying a number of maintenance operations to perform on the object.

3. The method of claim 1, wherein the sensor generates images of the surface of the object and further comprising:
    performing, using the testing system, non-destructive testing at the portion containing the inconsistency.

4. The method of claim 3, further comprising, using the pixel data, identifying the location for the inconsistency.

5. The method of claim 1 further comprising:
    sending the pixel data to the computer system; and
    determining, by the computer system analyzing the pixel data, the presence of the inconsistency on the surface of the object.

6. The method of claim 1, wherein determining the presence of an inconsistency comprises:
    comparing the pixel data to baseline data to form a comparison; and
    determining, using the comparison, the presence of the inconsistency.

7. The method of claim 1 further comprising:
    responsive to determining the presence of an inconsistency, identifying a number of locations on the surface of the object for the inconsistency.

8. The method of claim 1, wherein the baseline data is a number of images of the surface of the object generated by performing at least one of generating the number of images after manufacturing of the object and generating the number of images before a current use of the object.

9. The method of claim 1, wherein the pixel data about the surface of the object comprises at least one of still images and video of the surface of the object.

10. The method of claim 1, wherein generating the pixel data about the surface of the object comprises moving a number of cameras about a number of axes using pan and tilt of the number of cameras.

11. The method of claim 1, wherein the system comprises a number of cameras having fixed locations, and wherein generating the pixel data about the surface of the object using the sensor system comprises generating a number of images using the number of cameras having fixed locations while the object is stationary.

12. The method of claim 1, wherein the plurality of portions comprises a grid in a top view of the volume.

13. The method of claim 1, wherein the sensor systems are operated to generate pixel data about an entirety of the surface of the object substantially simultaneously.

14. An apparatus comprising:
a number of sensor systems configured to generate images of a surface of an object such that the number of sensor systems comprises: a mobile sensor system that moves a sensor of the mobile sensor system in a volume while generating pixel data about the object via a first robot, and a second robot that picks up, carries, and deploys the first robot on the object; and
a computer system in communication with the number of sensor systems and configured to:
identify, responsive to a presence of the object, a volume that contains the object,
divide the volume into a plurality of portions to cover substantially all of the surface of the object, such that pixel data may be generated for substantially all of the surface of the object, such that each pixel identifies a corresponding location on the object;
assign a sensor in the number of sensor systems to image a number of portions in the plurality of portions based on a pixel capability of the sensor;
generate the pixel data about the surface of the object;
identify, based upon the images, the object and baseline data for the object;
compare the pixel data to baseline data;
determine a presence of an inconsistency on the surface of the object; and
deploy a testing system to obtain higher resolution data about the inconsistency.

15. The apparatus of claim 14, wherein the computer system is further configured to identify a number of maintenance operations to perform on the object in response to a determination of the presence of the inconsistency.

16. The apparatus of claim 14 further comprising:
a mobile testing system, wherein the computer system is further configured to send the mobile testing system to each portion containing an inconsistency, and wherein the mobile testing system is configured to perform non-destructive testing at each portion.

17. The apparatus of claim 14, further comprising the computer system configured to: compare the pixel data to baseline data to form a comparison; and determine, using the comparison, the presence of the inconsistency.

18. The apparatus of claim 17, wherein the baseline data is a number of images of the surface of the object generated by performing at least one of generating the number of images after manufacturing of the object and generating the number of images before a current use of the object.

* * * * *